United States Patent
Dudko

(10) Patent No.: US 10,687,093 B2
(45) Date of Patent: Jun. 16, 2020

(54) SOCIAL-MEDIA-BASED TV SHOW PRODUCTION, DISTRIBUTION, AND BROADCAST SYSTEM

(71) Applicant: Social Media Broadcaster, LLC, Los Angeles, CA (US)

(72) Inventor: Mykhailo Dudko, Los Angeles, CA (US)

(73) Assignee: Social Media Broadcaster, Inc., Los Angeles, CA (US)

(*) Notice: Subject to any disclaimer, the term of this patent is extended or adjusted under 35 U.S.C. 154(b) by 0 days.

(21) Appl. No.: 15/860,621

(22) Filed: Jan. 2, 2018

(65) Prior Publication Data

US 2018/0192087 A1    Jul. 5, 2018

Related U.S. Application Data

(60) Provisional application No. 62/440,428, filed on Dec. 30, 2016.

(51) Int. Cl.
*H04N 21/2343* (2011.01)
*H04N 21/2187* (2011.01)
*H04N 21/81* (2011.01)
*H04N 21/488* (2011.01)
*H04N 21/235* (2011.01)
(Continued)

(52) U.S. Cl.
CPC ......... *H04N 21/2343* (2013.01); *H04N 5/262* (2013.01); *H04N 5/2624* (2013.01); *H04N 21/2187* (2013.01); *H04N 21/235* (2013.01); *H04N 21/23424* (2013.01);
(Continued)

(58) Field of Classification Search
CPC ........... H04N 21/2343; H04N 21/2187; H04N 21/235; H04N 21/4788; H04N 21/4882; H04N 21/814; H04N 5/2624; H04N 5/262; H04N 21/2665; H04N 21/23424
See application file for complete search history.

(56) References Cited

U.S. PATENT DOCUMENTS

2008/0129825 A1* 6/2008 DeAngelis ......... A63B 24/0021
                                                            348/169
2010/0296571 A1* 11/2010 El-Saban ......... H04N 21/21805
                                                         375/240.01

(Continued)

*Primary Examiner* — Junior O Mendoza
*Assistant Examiner* — Aklil M Tesfaye

(57) ABSTRACT

Disclosed are systems and techniques for producing, distribution and broadcasting a live social-media-based TV show ("social-media show"), such as live social media reality show, based on one or multiple live video streams produced by one or multiple social media influencers who serve as show hosts for the live show. The disclosed systems and techniques provide a unique social-media-show production pipeline that allows for a real-time collaborative production of a "TV-like" reality show between multiple social media influencers (or "SMIs") and live broadcast/distribution of the produced social-media show based on a disclosed production format of social-media show(s). In various embodiments, the live broadcast of a produced social-media show can be simultaneously distributed through multiple SMIs' existing social media accounts/channels associated with multiple social media platforms, and viewed by the followers of these influencers through the private social media accounts of the multiple social media platforms of the followers.

16 Claims, 6 Drawing Sheets

(51) Int. Cl.
*H04N 21/4788* (2011.01)
*H04N 5/262* (2006.01)
*H04N 21/2665* (2011.01)
*H04N 21/234* (2011.01)

(52) U.S. Cl.
CPC ..... *H04N 21/2665* (2013.01); *H04N 21/4788* (2013.01); *H04N 21/4882* (2013.01); *H04N 21/814* (2013.01)

(56) References Cited

U.S. PATENT DOCUMENTS

| | | | |
|---|---|---|---|
| 2013/0222601 A1* | 8/2013 | Engstrom | G11B 27/034 348/159 |
| 2014/0108534 A1* | 4/2014 | Good | H04L 65/4084 709/204 |
| 2014/0108556 A1* | 4/2014 | Abhyanker | G06Q 50/01 709/204 |
| 2014/0143437 A1* | 5/2014 | Mathur | H04N 21/2187 709/231 |
| 2015/0040165 A1* | 2/2015 | Zajac | H04N 7/181 725/59 |
| 2015/0043892 A1* | 2/2015 | Groman | H04N 21/47205 386/278 |
| 2018/0041552 A1* | 2/2018 | Ormseth | H04L 65/1093 |

* cited by examiner

US 10,687,093 B2

SOCIAL-MEDIA-BASED TV SHOW PRODUCTION, DISTRIBUTION, AND BROADCAST SYSTEM

PRIORITY CLAIM AND RELATED PATENT APPLICATIONS

This patent document claims benefit of priority under 35 U.S.C. 119(e) to U.S. Provisional Patent Application No. 62/440,428 entitled "SOCIAL-MEDIA-BASED TV SHOW PRODUCTION AND DISTRIBUTION SYSTEM," filed on Dec. 30, 2016. The disclosures of the above application are incorporated by reference in their entirety as a part of this document.

TECHNICAL FIELD

This patent document relates to systems, devices, and processes for producing, distributing, and broadcasting a live social-media-based TV show based on multiple live video streams generated by multiple social media influencers who serve as hosts of the live social-media-based TV show.

BACKGROUND

Rapid growth in social media technology and computing technology have enabled using social media platforms to broadcast live shows and events, such as concerts and sporting events. However, existing internet and web-based broadcasting services are limited to streaming of an event that is hosted by a single social media influencer.

SUMMARY

Disclosed are systems and techniques for producing, distribution and broadcasting a live social-media-based TV show, such as live social media reality show, based on one or multiple live video streams produced by one or multiple social media influencers who serve as show hosts for the live show. The disclosed systems and techniques provide a unique social-media-show production pipeline that allows for a real-time collaborative production of a "TV-like" reality show between multiple Social Media Influencers (also referred to as "SMIs" or "influencers" hereinafter) and live broadcast/distribution of the produced TV-like reality show based on a disclosed production format of social-media-based TV show(s). In various embodiments, the live broadcast of a produced social-media-based TV show (also referred to as a "social-media show" hereinafter) can be simultaneously distributed through multiple social media influencers' existing social media accounts/channels associated with multiple social media platforms, including, but are not limited to YouTube Live, Twitter Live, Facebook Live, Instagram Stories, and other live social media platforms, and viewed by the followers of these influencers through the private social media accounts of the multiple social media platforms of the followers. The disclosed social-media-show production and distribution/broadcasting system provides an innovative way of distributing and monetizing the produced social-media shows through the dedicated channels of distribution and through existing personal social media accounts of the influencers who host these shows.

In one aspect, a process for producing and broadcasting a live social-media show based on multiple live video streams generated by multiple social media influencers who serve as hosts of the live show is disclosed. This process can include the steps of: at a first production location of the live show, receiving a first set of live video streams from a first group of social media influencers (SMIs) located at the first production location, wherein each of the first group of SMIs hosts the live show by producing at least of one of the first set of live video streams; and editing the first set of live video streams in real-time to generate a first live sequence which includes the first set of live video streams arranged in a given sequential order. This process also simultaneously performs the steps of: at a second production location of the live show, receiving a second set of live video streams from a second group of SMIs located at the second production location, wherein each of the second group of SMIs hosts the live show by producing at least of one of the second set of live video streams; and editing the second set of live video streams in real-time to generate a second live sequence which includes the second set of live video streams arranged in a given sequential order. The process additionally includes the steps of: simultaneously receiving a stream of the first live sequences from the first production location and a stream of the second live sequences from the second production location; producing a live streaming sequence of the live show by interleaving the received stream of the first live sequences and the received stream of the second live sequences; and producing a final content of the live show based on the produced live streaming sequence.

In some embodiments, the process broadcasts the produced final content by simultaneously distributing the final content to a set of social media accounts of each SMI in of the first group of SMIs and the second group of SMIs.

In some embodiments, the process simultaneously distributes the final content to the set of social media accounts by simultaneously distributing the final content to each of a set of social media platforms logged on by the given SMI.

In some embodiments, the process simultaneously distributes the final content to the set social media platforms by (1) duplicating the live signal of the final content into a set of duplicated signals; and (2) subsequently transmitting the duplicated signals to each of the set of social media platforms logged on by the given SMI one at a time.

In some embodiments, the process allows the followers of each SMI in the first group of SMIs and the followers of each SMI in the second group of SMIs to watch the final content through the set of social media platforms logged on by each SMI in the first group of SMIs and each SMI in the second group of SMIs.

In some embodiments, the process further includes the steps of: receiving an emergency broadcast request from a given SMI within the first group of SMIs and the second group of SMIs; and if the requested emergency broadcast is confirmed by the server, streaming the emergency broadcast of the given SMI to each of the social media platforms logged on by the given SMI.

In some embodiments, the process produces the final content of the live show based on the produced live streaming sequence by: adding metadata into the produced live streaming; and adding a show intro of predetermined length at the beginning of the produced live streaming to generate the final content.

In another aspect, a system for producing and broadcasting a live social-media show based on multiple live video streams generated by multiple social media influencers who serve as hosts of the live show is disclosed. This system can include a first on-set switcher located at a first production location of the live show, and the first on-set switcher is configured to: receive a first set of live video streams from a first group of SMIs located at the first production location, each of the first group of SMIs hosts the live show by producing at least of one of the first set of live video streams; and edit the first set of live video streams in real-time to generate a first live sequence which includes the first set of live video streams arranged in a given sequential order. This system can further include a second on-set switcher located at a second production location of the live show, and the second on-set switcher is configured to: receive a second set of live video streams from a second group of SMIs located at the second production location, each of the second group of SMIs hosts the live show by producing at least of one of the second set of live video streams; and edit the second set of live video streams in real-time to generate a second live sequence which includes the second set of live video streams arranged in a given sequential order. This system further includes a master switcher coupled to the first on-set switcher and the second on-set switcher and configure to: simultaneously receive a stream of the first live sequences from the first on-set switcher and a stream of the second live sequences from the second on-set switcher; produce a live streaming sequence of the live show by interleaving the received stream of the first live sequences and the received stream of the second live sequences; and produce a final content of the live show based on the produced live streaming sequence.

In some embodiments, the system further includes a streaming server coupled to the master switcher. This streaming server is configured to receive the produced final content from the master switcher; and broadcast the produced final content by simultaneously distributing the final content to a set of social media accounts of each SMI in of the first group of SMIs and the second group of SMIs.

In some embodiments, the streaming server can simultaneously distribute the final content to each of a set of social media platforms logged on by the given SMI.

In some embodiments, the streaming server is configured to duplicate the live signal of the final content into a set of duplicated signals; and transmit the duplicated signals to each of the set of social media platforms logged on by the given SMI one at a time.

In some embodiments, the streaming server operates to allow the followers of each SMI in the first group of SMIs and the followers of each SMI in the second group of SMIs to watch the final content through the set of social media platforms logged on by each SMI in the first group of SMIs and each SMI in the second group of SMIs.

In some embodiments, the streaming server is further configured to receive an emergency broadcast request from a given SMI within the first group of SMIs and the second group of SMIs; and if the requested emergency broadcast is confirmed, stream the emergency broadcast of the given SMI to each of the social media platforms logged on by the given SMI.

In some embodiments, the master switcher is further configured to: add metadata into the produced live streaming; and add a show intro of predetermined length at the beginning of the produced live streaming to generate the final content.

BRIEF DESCRIPTION OF THE DRAWINGS

In the figures, like reference numerals refer to the same figure elements.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Disclosed are systems and techniques for producing, distribution and broadcasting a live social-media-based TV show, such as live social media reality show, based on one or multiple live video streams produced by one or multiple social media influencers who serve as show hosts for the live show. The disclosed systems and techniques provide a unique social-media-show production pipeline that allows for a real-time collaborative production of a "TV-like" reality show between multiple Social Media Influencers (also referred to as "SMIs" or "influencers" hereinafter) and live broadcast/distribution of the produced TV-like reality show based on a disclosed production format of social-media-based TV show(s). In various embodiments, the live broadcast of a produced social-media-based TV show (also referred to as a "social-media show" hereinafter) can be simultaneously distributed through multiple social media influencers' existing social media accounts/channels associated with multiple social media platforms, including, but are not limited to YouTube Live, Twitter Live, Facebook Live, Instagram Stories, and other live social media platforms, and viewed by the followers of these influencers through the private social media accounts of the multiple social media platforms of the followers. The disclosed social-media-show production and distribution/broadcasting system provides an innovative way of distributing and monetizing the produced social-media shows through the dedicated channels of distribution and through existing personal social media accounts of the influencers who host these shows.

Figure 1:
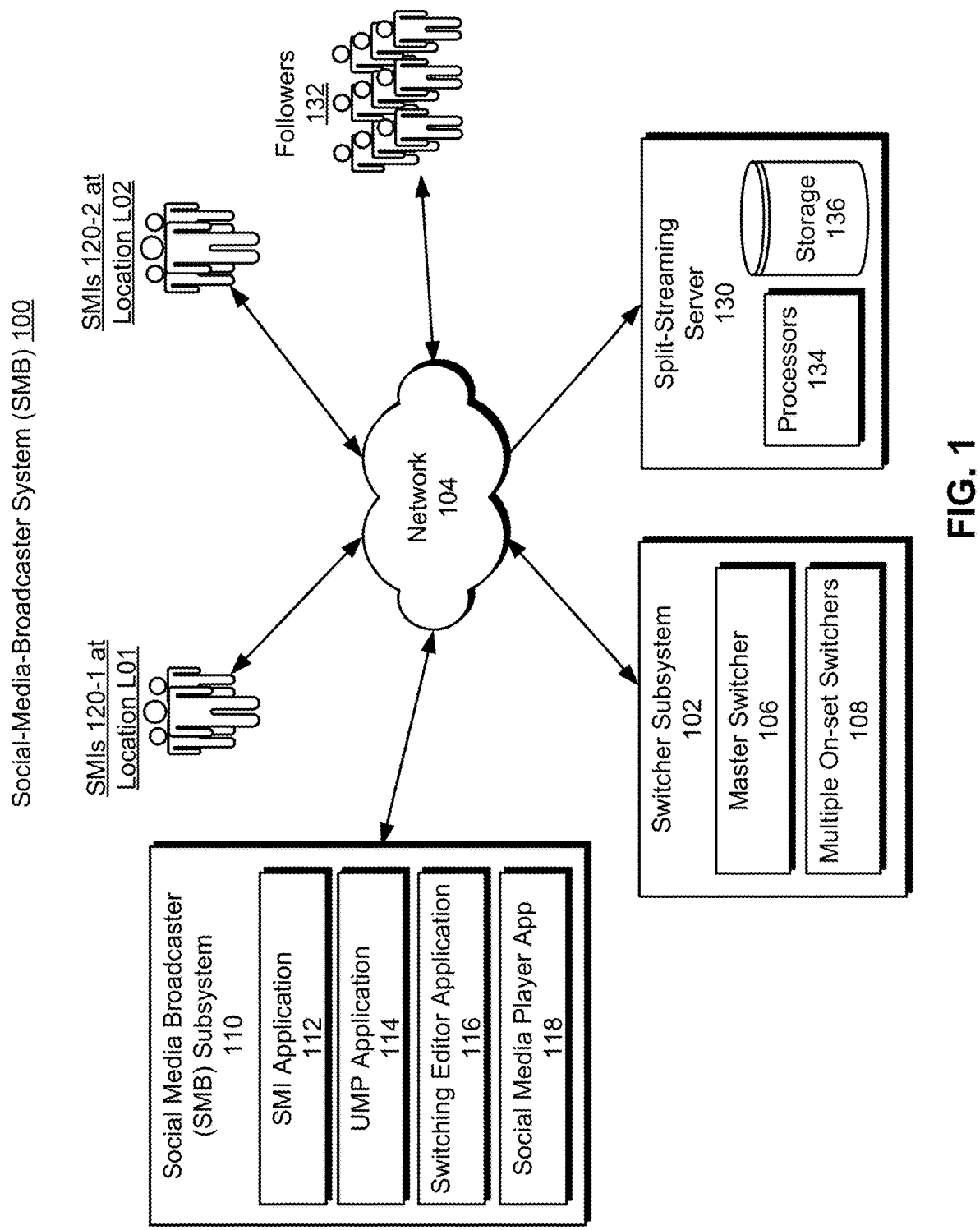
FIG. 1 shows a block diagram illustrating a conceptual view of the proposed live social-media-based TV show(s) production, distribution, and broadcasting system in accordance with some embodiments described herein.

FIG. 1 shows a block diagram illustrating a conceptual view of the proposed live social-media-based TV show(s) production, distribution, and broadcasting system 100 in accordance with some embodiments described herein. The disclosed social-media-based TV show(s) production, distribution, and broadcasting system, such as the exemplary system 100 is also referred to as the "social-media-broadcaster system," or "SMB system," e.g., "social-media-broadcaster system 100," or "SMB system 100" hereinafter. As can be seen in FIG. 1, social-media-broadcaster system 100 can include a switcher subsystem 102 which includes both hardware and software for producing the social media shows hosted by multiple SMIs. Note that switcher subsystem 102 can include a master switcher/showrunner subsystem 106 (or simply "master switcher 106" hereinafter) and multiple portable on-set live production switcher subsystems 108 (or simply "on-set switchers 108" hereinafter).

In some embodiments, each on-set switcher 108 is a device located at a particular production location and configured to receive live video stream inputs from multiple video sources of multiple SMIs located at that particular production location, process the received live video streams, and generate a final video sequence. Note that when processing the multiple video sources, on-set switcher 108 can switch between the multiple video sources. In some embodiments, master switcher 106 is a device configured to receive multiple video sequences from multiple on-set switchers 108 located at multiple locations, process the received multiple video sequences, and produce a complete episode of a live show. Note that when processing the multiple video sources, master switcher 106 can switch between the multiple video sequences. Note that although master switcher 106 and multiple on-set switchers 108 are shown in FIG. 1 as enclosed within switcher subsystem 102, master switcher 106 and each of the multiple on-set switchers 108 can be physically located at different locations, and coupled to and communicate with one another through network 104, wherein network 104 can include a local area network ("LAN"), a wide area network ("WAN"), or an Intranet, or a network of networks, such as the Internet.

As can be seen in FIG. 1, social-media-broadcaster system 100 can also include a social-media-broadcaster (SMB) subsystem 110, which is a collection of software applications/components/modules that can be installed and executed on various hardware devices/apparatus/subsystems of social-media-broadcaster system 100 to implement the proposed functionalities, such as live show production, distribution and broadcasting of the social-media-broadcaster system 100. More specifically, SMB subsystem 110 can include a social media influencer (SMI) application/module 112, a unit production manager (UPM) application/module 114, and a unit live switching editor ("switching editor") application/module 116, and a social media player application/module 118.

In some embodiments, SMI application 112 is configured to manage various social media accounts and activities of a particular SMI before, during a live show production, and during the distribution/broadcasting of a live show hosted by that SMI. In some embodiments, UPM application 114 is configured to manage and interact with a group of SMIs at a particular shooting/production location (e.g., a first group of SMIs 120-1 at location L01 and a second group of SMIs 102-2 at location L02 shown in FIG. 1). In some embodiments, switching editor application 116 is configured to perform real-time video editing, real-time switching among different video sources, and to communicate with the master switcher 106 during a live show production.

In some embodiments, social media player application 118 is to be installed on a social media player device (e.g., a mobile phone, a tablet computer, a laptop computer, a desktop computer, or a Smart TV) of a user of SMB system 100, such as a follower 132 among a group of followers 132 of one or more SMIs 120, for receiving a produced live show hosted by the one or more SMIs 120 from split-streaming server 130, and viewing and participating in the live show. In some embodiments, social media player application 118 is configured to allow users of SMB system 100 to browse and watch high quality TV-like content on SMB system 100 with convenience of Netflix and functionality of Instagram.

Although the proposed social-media-broadcaster system 100 of FIG. 1 shows two production locations, other embodiments of the proposed social-media-broadcaster system 100 can include a single production location or more than two productions locations. In some embodiments, the proposed social-media-broadcaster system 100 requires at least two SMIs to host a live show, even if there is only a single production location. As a result, the audience of the live show can include followers of each of the at least two SMIs who host the live show. The proposed system 100 allows for combining the talents (i.e., the SMIs) and resources (including the combined followers of the multiple SMIs involved in the live show production) to collaboratively produce and distribute "TV-like" high quality entertainment content in real-time. These multiple host SMIs can host the live show from the same video shooting/production location or from different video shooting/production locations. With multiple SMIs who host a live show, a subgroup of the host SMIs can be at a same location, and two subgroups of the host SMIs can be at two different locations. In some embodiments, each of the two or more SMIs who host the live show is assigned a broadcaster account to the live show.

Note that SMI application 112 of the disclosed social-media-broadcaster subsystem 110 can be integrated with, e.g., stored in the memory of, each of the camera devices of SMIs 120 used for producing the live shows. In some embodiments, SMI application 112 of SMB subsystem 110 can be stored on a server or a cloud and accessed by the camera devices of SMIs 120 over network 104 during a live show production. UPM application 114 and switching editor application 116 of SMB subsystem 110 can be integrated with or installed on each of the on-set switchers 108 in switcher subsystem 106. In some embodiments, UPM application 114 and switching editor application 116 can be stored on a server or a cloud and accessed by each of the on-set switchers 108 over network 104 during a live show production. Note that each of the modules of SMB subsystem 110, i.e., SMI application 112, UPM application 114, switching editor application 116, and social media player application 118 can be implemented as a web application, a mobile application, a native application, and/or another type of client-server application that is accessed over network 104.

Social-media-broadcaster system 100 can also include a split-streaming server 130 configured to capture/receive complete episodes of live shows comprising the video streams and metadata generated by master switcher 106. In some embodiments, split-streaming server 130 is configured to distribute/broadcast/stream, over network 104, the complete episode produced by master switcher 106 to various connected social media accounts of SMIs 120 who are involved in the production of the complete episode of the live show, so that the followers 132 of the host SMIs 120 can view the live broadcast of the complete episode through the various social media platforms, such as YouTube Live, Twitter Live, Facebook Live, and Instagram Stories, among others. In some embodiments, split-streaming server 130 is also configured to store the complete episode in a content library (e.g., within storage 136 or a separate storage coupled to split-streaming server 130 (not shown)) and manage the on-demand playback of the stored complete episode at a later time. In some embodiments, split-streaming server 130 is also configured to stream an emergency episode originated from the SMI who requested an emergency broadcast.

Split-streaming server 130 includes one or more processors 134 and storage 136. Processors 134 can execute the above-described and below-described functions of split-streaming server 130 of this disclosure, wherein these functions can be stored in storage 136. In some embodiments, storage 136 includes one or more memory devices. In some embodiments, split-streaming server 130 can be a single computing device such as a computer server. In other embodiments, split-streaming server 130 can represent more than one computing device working together to perform the actions of a server computer (e.g., cloud computing). In some embodiments, split-streaming server 130 may host some or all modules of SMB subsystem 110.

Figure 2:
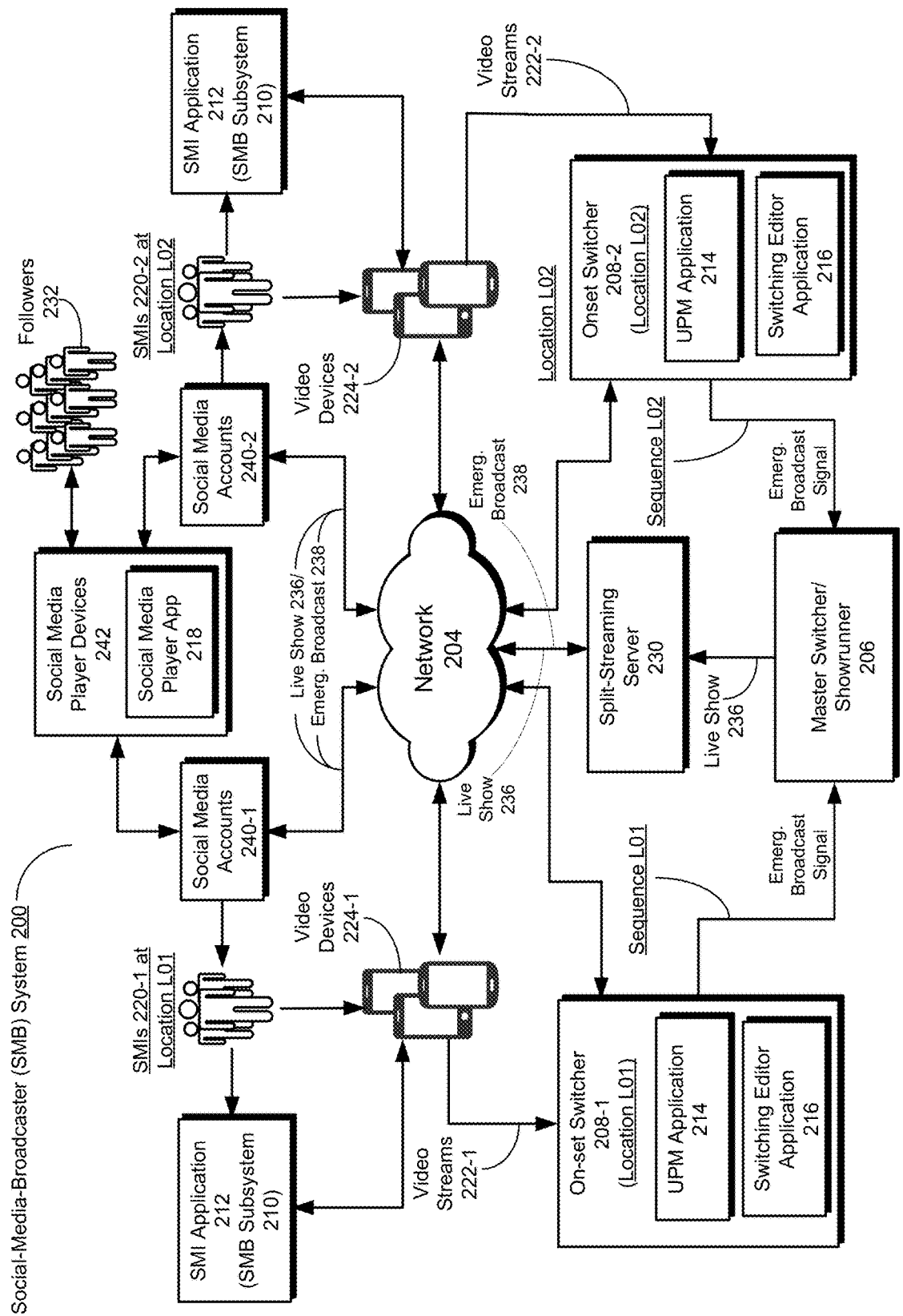
FIG. 2 shows a block diagram illustrating an exemplary implementation of the social-media-broadcaster system of FIG. 1 in accordance with some embodiments described herein.

FIG. 2 shows a block diagram illustrating an exemplary implementation 200 of social-media-broadcaster system 100 in accordance with some embodiments described herein. Note that the exemplary social-media-broadcaster (SMB) system 200 shows a collaborative production of a social-media show by two groups of SMIs at two shooting/production locations: i.e., SMIs 220-1 at shooting/production location "L01" and SMIs 220-2 at shooting/production location "L02." Note that although the exemplary social-media-broadcaster system 200 is configured for a collaborative production of a social-media show by multiple SMIs at two shooting/production locations, the disclosed social-media-broadcaster system can also be used to a produce a social-media show by multiple SMIs at a single shooting/production location or at more than two shooting/production locations. Further, although the exemplary social-media-broadcaster system 200 is configured for a collaborative production of a social-media show by multiple SMIs at each of the two shooting/production locations, the disclosed SMB system 200 can also be used to a produce a social-media show at multiple shooting/production locations, wherein there can be any number of SMIs (i.e., one or more SMIs) at each of the multiple shooting/production locations.

In some embodiments, the proposed social-media-broadcaster system 200 requires at least two SMIs to host a live show, even if there is only a single shooting/production location. As a result, the audience of the live show can include followers of each of the at least two SMIs who host the live show. The proposed system 200 allows for combining the talents (i.e., the SMIs) and resources (including the combined followers of the multiple SMIs involved in the live show production) to collaboratively produce and distribute "TV-like" high quality entertainment content in real-time. These multiple host SMIs can host the live show from the same location or from different locations. With multiple SMIs who host a live show, a subgroup of the host SMIs can be at a same shooting/production location, and two subgroups of the host SMIs can be at two different shooting/production locations. In some embodiments, each of the two or more SMIs who host the live show is assigned a broadcaster account to the live show.

As can be seen in FIG. 2, exemplary social-media-broadcaster system 200 includes various above-described hardware and software subsystems, modules and applications in conjunction with SMB system 100, which are coupled to one another and operate both independently and collaboratively with one another to achieve the features and functionalities of social-media-broadcaster system 100 described above and additional functionalities described below in conjunction with the exemplary social-media-broadcaster system 200.

Specifically, social-media-broadcaster system 200 can include two on-set switchers 208-1 and 208-2 located at location L01 and location L02, respectively. The first on-set switcher 208-1 is configured to receive multiple live video streams 222-1 from multiple video sources captured by multiple video capturing devices 224-1 of SMIs 220-1 located at L01, process the received live video streams 222-1, and generate a final video sequence "L01." Note that when processing the multiple live video streams 222-1, on-set switcher 208-1 can switch between the multiple video streams 222-1. Similarly, the second on-set switcher 208-1 is configured to receive multiple live video streams 222-2 from multiple video sources captured by multiple video capturing devices 224-2 of SMIs 220-2 located at L02, process the received live video streams 222-2, and generate a final video sequence "L02." Note that when processing the multiple live video streams 222-2, on-set switcher 208-2 can switch between the multiple video streams 222-2. It can be understood that, if social-media-broadcaster system 200 includes additional shooting/production locations (e.g., locations L03 and L04), each of the additional shooting/production locations can have its own on-set switcher (e.g., on-set switchers 208-3 and 208-4)

Social-media-broadcaster system 200 includes a master switcher/showrunner 206 (or simply "master switcher 206" hereinafter) which is configured to simultaneously receive final video sequences L01 and L02 from the two on-set switchers 208-1 and 208-2 located at locations L01 and L02, process the video sequences L01 and L02, and produce a complete episode of a live show 236. Note that on-set switchers 208-1 can continuously produce a stream of final sequences L01, on-set switchers 208-2 can continuously produce a stream of final sequences L02, and master switcher 206 can continuously receive the two streams of final video sequences L01 and L02. Note that when processing the two streams of final sequences L01 and L02, master switcher 206 can switch between these two video sequences. Note that master switcher 206 can be physically located at a location different from locations L01 and L02, and coupled to and communicate with on-set switchers 208-1 and 208-2 through network 204.

Generally speaking, the disclosed master switcher 206 of SMB system 200 can simultaneously edit multiple (i.e., two or more) video sequences received from multiple (i.e., two or more) different production locations produced by multiple (i.e., two or more) on-set switchers 208 into a "complete/final episode." During the editing to generate the complete/final episode, master switcher 206 can switch among the multiple video sequences to "stitch"/interleave the multiple video sequences into a particular sequential order to obtain the complete/final episode of the live show. In some embodiments, when producing the complete/final episode of live show 236, master switcher 206 is configured to automatically enforce a predetermined length of short delay, e.g., 5 seconds, at the beginning of the generate final sequence. In some embodiments, master switcher 206 can also add a short intro, e.g., a movie clip of the predetermined length, e.g., 5 seconds prior to retranslating the generated final sequence into the complete episode of live show 236. In some embodiments, the above-described enforced short delay can be created by inserting the above-described short intro.

In some embodiments, when retranslating the generated final sequence into the complete/final episode of live show 236, master switcher 206 of SMB system 200 is configured to add one or more of: visual FX, infographics, and music to the complete/final episode and compile these data into the complete/final episode in real-time.

In some embodiments, after creating the complete/final episode of live show 236, master switcher 206 is configured to stream the complete/final episode further down the production pipeline of the social-media-broadcaster system 200.

Referring back to FIG. 2, note that social-media-broadcaster system 200 also includes the various software applications of the SMB subsystem 210. Specifically, for a given SMI 220-1 or SMI 220-2, a copy of SMI application 212 of SMB subsystem 210 can be installed on a personal device of the SMI used for producing the live show 236 at location L01 or location L02, for example, on a video capturing device 224-1 or 224-2 of the given SMI 220-1 or SMI 220-2. In some embodiments, SMI application 212 of SMB subsystem 210 can be installed on a personal device of a given SMI 220-1 or SMI 220-2 different from the video capturing device 224-1 or 224-2 of the given SMI. For example, a given SMI 220-1 may use a smartphone or a wireless live stream camera to capture a video stream while use a laptop computer installed with SMI application 212 to manage various social media accounts, process the captured video and produce the live stream 222-1. As described above, the installed SMI application 212 of SMB subsystem 210 can be used to manage various social media accounts and activities of a particular host SMI 220-1 or SMI 220-2 before and during a live show (including the production and the distribution of the live show) hosted by the given SMI.

In some embodiments, to begin a live show, a host SMI 220 logs in with multiple social media accounts and temporarily allows SMI application 212 of SMB subsystem 210 to take control of these social media accounts on behalf of the host SMI 220 within a certain time frame, e.g., during the production and distribution of a live episode of a particular assigned reality-TV-format show. Next, host SMI 220 can begin the live show by shooting live videos with a video device 224, such as a camera on a mobile phone, or a standalone wireless live stream camera.

In some embodiments, SMI application 212 of SMB subsystem 210 is configured to take control of the connected social media accounts of each host SMI 220 during a live streaming session and can perform some or all of the following functionalities on behalf of a given host SMI:
  Determine whether or not to continue streaming a previous session:
    If YES,
      automatically assign a consequent episode number;
      automatically notify UPM application 214;
      automatically tag show contestants/heroes;
      stream the session to social media player application 218 installed on social media player devices 242 of followers 232;
      stream to connected social media platforms of all host SMIs 220 hosting the show;
    If NO, request for confirmation that it is an emergency broadcast;
  Connect social media account(s) of the given host SMI;
  Pick a show from a set of available shows the given SMI hosts (e.g., only assigned shows are available);
  Confirm the host SMI's name (e.g., this can be a semi-automatic process);
  Allow automatic geo-location tagging (e.g., this function is enabled/disabled through using a YES/NO selector);
  Activate real-time voting (e.g., this function is enabled/disabled through using a YES/NO selector);
  Assign a "Special Event" (e.g., this function is enabled/disabled through using a YES/NO selector);
  Assign a "Theme" (e.g., this function is enabled/disabled through using a YES/NO selector);
  Include a lock on simultaneous streaming options to different social media platforms according to agreement with the given host SMI;
  Perform a countdown to the next broadcast (e.g., through using automatic push-notification reminders);
  Confirm this is an emergency broadcast (YES/NO):
    If "YES,"
      automatically copy metadata from previous episode excluding the geo-location tagging;
      Exclude "special event" tagging;
      Assign theme as emergency broadcast with consequent number;
      Assigns SQL data base position between previous and next full episodes; and
      Emergency broadcast streams through the disclosed SMB system 200 and through the given host SMI's personal connected social media platforms;
  Collect view-count data from the given host SMI's connected social media accounts;
  Delete live stream content from the connected social media accounts of the given host SMI after the live broadcast, and replace with hyperlinks such as to "Watch Again" to make the content available only through a social media player library of the disclosed SMB system 200.

As can be seen in FIG. 2, each of the two on-set switchers 208 includes a copy of UPM application 214 of SMB subsystem 210 and a copy switching editor application 216 of SMB subsystem 210. As described above, UPM application 214 stored and/or installed on on-set switcher 208-1 can be used to manage and interact with SMIs 220-1 at location L01 and UPM application 214 installed on on-set switcher 208-2 can be used to manage and interact with SMIs 220-2 at location L02. In some embodiments, UPM application 214 on a given on-set-switcher can also interact with the followers of SMIs 220.

In some embodiments, after detecting a host SMI 220 begins a live show production/streaming session, UPM application 214 is configured to confirm host SMI 220's broadcast session (disabled if the live streaming session is an emergency broadcast). In some embodiments, UPM application 214 is also configured to assign metadata to each of the social media accounts 240 the host SMI 220 is logged on for broadcasting the live show. Some examples of the assigned metadata can include, but are not limited to: (1) push-notification reminders for countdown to the next broadcast session; (2) tagging heroes/contestants; and (3) tagging sponsorship. In some embodiments, UPM application 214 is additionally configured to manage live commenting/voting notifications from followers 232 for the host SMIs 220 on set Referring back to FIG. 2, note that switching editor application 216 stored and/or installed on on-set switcher 208-1 can be used to perform real-time video editing, real-time switching among different video sources 222-1, and to communicate with the master switcher 206 during a live show production. Similarly, switching editor application 216 stored and/or installed on on-set switcher 208-2 can be used to perform real-time video editing, real-time switching among different video sources 222-2, and to communicate with the master switcher 206 during a live show production. In some embodiments, instead of being stored locally, UPM application 214 and switching editor application 216 of SMB subsystem 210 can be stored on a server or a cloud and accessed by each of the on-set switchers 208-1 and 208-2 over network 204 during a live streaming session.

In some embodiments, during the live show production, switching editor application 216 of SMB subsystem 210 is configured to: (1) perform real-time in-camera cropping/editing; (2) perform real-time switching between different video sources; and (3) redirect a produced final sequence (e.g., sequence L01 or sequence L02) to master switcher 206.

As can be seen in FIG. 2, social media player application 218 of SMB subsystem 210 is installed on social media player devices 242 (e.g., mobile phones, tablet computers, laptop computers, desktop computers, or Smart TVs) of users of SMB system 200 and followers 232 of SMIs 220 (collectively referred to as "followers 232"), for receiving live show 236 from split-streaming server 230, and viewing and participating in live show 236. In some embodiments, social media player application 218 is configured to allow followers 232 to browse and watch high quality TV-like content on SMB system 200 with convenience of Netflix and functionality of Instagram.

In some embodiments, social media player application 218 which is installed on a social media player device 242 of a given follower 232, includes and can perform some or all of the following functionalities:

- Allow the given follower 232 to login with a social media account, such as a primary social media account of follower 232 to view live show 236;
- Allow the given follower 232 to connect other social media accounts of follower 232 for voting/commenting purposes. For example, in some embodiments, follower 232 can choose to vote/comment live show 306 with his/her primary social media account only and/or with two or more selected connected social media accounts simultaneously;
- Allow the given follower 232 to browse/search available shows based on one or more of the following options: categories, titles, SMIs, metadata, themes, special events, genres, and sponsors. For example, in some embodiments, social media player application 218 allows follower 232 to browse/search shows by watching trailers. In some embodiments, follower 232 is able to follow a show through automatic countdown push notifications;
- Allow the given follower 232 to browse/search SMIs. For example, in some embodiments, social media player application 218 allows follower 232 to follow an SMI 220 using automatic countdown push notifications for all assigned shows. In some embodiments, social media player application 218 allows for emergency broadcast push notifications on social media player device 242 of follower 232;
- Allow the given follower 232 to browse/search available shows by heroes/contestants, if there is any;
- Allow the given follower 232 to get promotional coupons (e.g., for show-sponsoring companies' products and services);
- Allow the given follower 232 to earn/use points (including referral points);
- Allow the given follower 232 to apply to become a show Hero on the page of the show; and
- Allow the given follower 232 to provide recommendations of shows based on previous following in his/her pre-existing social media accounts.

Exemplary social-media-broadcaster system 200 also includes a split-streaming server 230 coupled to master switcher 206 to receive a complete episode of live show 236 composed of the final sequences of the live video streams and metadata generated by master switcher 206. As described above, split-streaming server 230 is configured to distribute/broadcast/stream the complete episode of live show 236 over network 204 and through various connected social media accounts 240-1 and 240-2 of SMIs 220 who are involved in the production of live show 236, to social media player devices 242 of followers 232 of the host SMIs 220. Hence, followers 232 of the host SMIs 220 can view live show 236 on their social media player devices 242 using the installed social media player application 218 described above. In some embodiments, split-streaming server 230 is also configured to store the complete episode in a content library and manage the on-demand playback of live show 236 at a later time. In some embodiments, split-streaming server 230 is also configured to stream an emergency episode 238 originated from a given SMI 220 who has requested an emergency broadcast.

In some embodiments, split-streaming server 230 of SMB system 200 is configured to receive the live stream signal of the complete episode and duplicate the live stream signal into duplicated signals and subsequently transmit the duplicated live stream signals to a set of dedicated virtual client sub-servers/computers (which can be implemented as a set of computers). In some embodiments, each virtual client computer operates on behalf of a single social media account assigned to the live show and on behalf of one particular host SMI 220. More specifically, each virtual client computer can simulate live streaming of the complete episode to multiple social media platforms linked to and logged on by that particular host SMI one at a time. For example, if there are four social media platforms logged on by a given host SMI 220: Youtube Live, Facebook Live, Twitter Live, Instagram Stories, then the virtual client computer dedicated to this host SMI streams the complete episode to the four social media platforms one at a time.

In some embodiments, split-streaming server 230 of SMB system 200 is configured to stream the complete episode in-App to all connected social media accounts 240 of the host SMIs 220 who host the live show 236. In some embodiments, after live broadcast of live show 236 has been aired, split-streaming server 230 is configured to replace the complete episode of live show 236 with both a short preview and a notification such as "Watch Full Episode Again" hyperlink in social media player application 218 installed on social media player devices 242 of all connected social media accounts of the host SMIs 220 of live show 236. In some embodiments, after live broadcast of live show 236 has been aired, split-streaming server 230 of SMB system 200 is configured to store the complete episode in an in-App content library for later on-demand playback.

In some embodiments, split-streaming server 230 of SMB system 200 is configured to manage, including receiving, processing and broadcasting an emergency broadcast requested by a given host SMI 220 during a live show event. More specifically, during a live show broadcasting session, a host SMI 220 requests an emergency broadcast, e.g., through SMI application 212 installed on a connected device of host SMI 220. As can be seen in FIG. 2, the emergency broadcast signal of the given host SMI 220 is streaming directly to master switcher 206 and then split-streaming server 230. In some embodiments, after receiving the emergency broadcast signal, split-streaming server 230 is configured to assign a short emergency broadcast intro, for example, 5-second in length to the received emergency broadcast signal to create an emergency episode 238. Next, split-streaming server 230 streams the emergency episode 238 through social media player application 218 to social media player devices 242 of only those connected social media accounts of the given host SMIs 220 who requested the emergency broadcast. In some embodiments, the emergency broadcast can be available in-App as long as through the connected social media accounts of the given SMI who requested the emergency broadcast.

Figure 3:
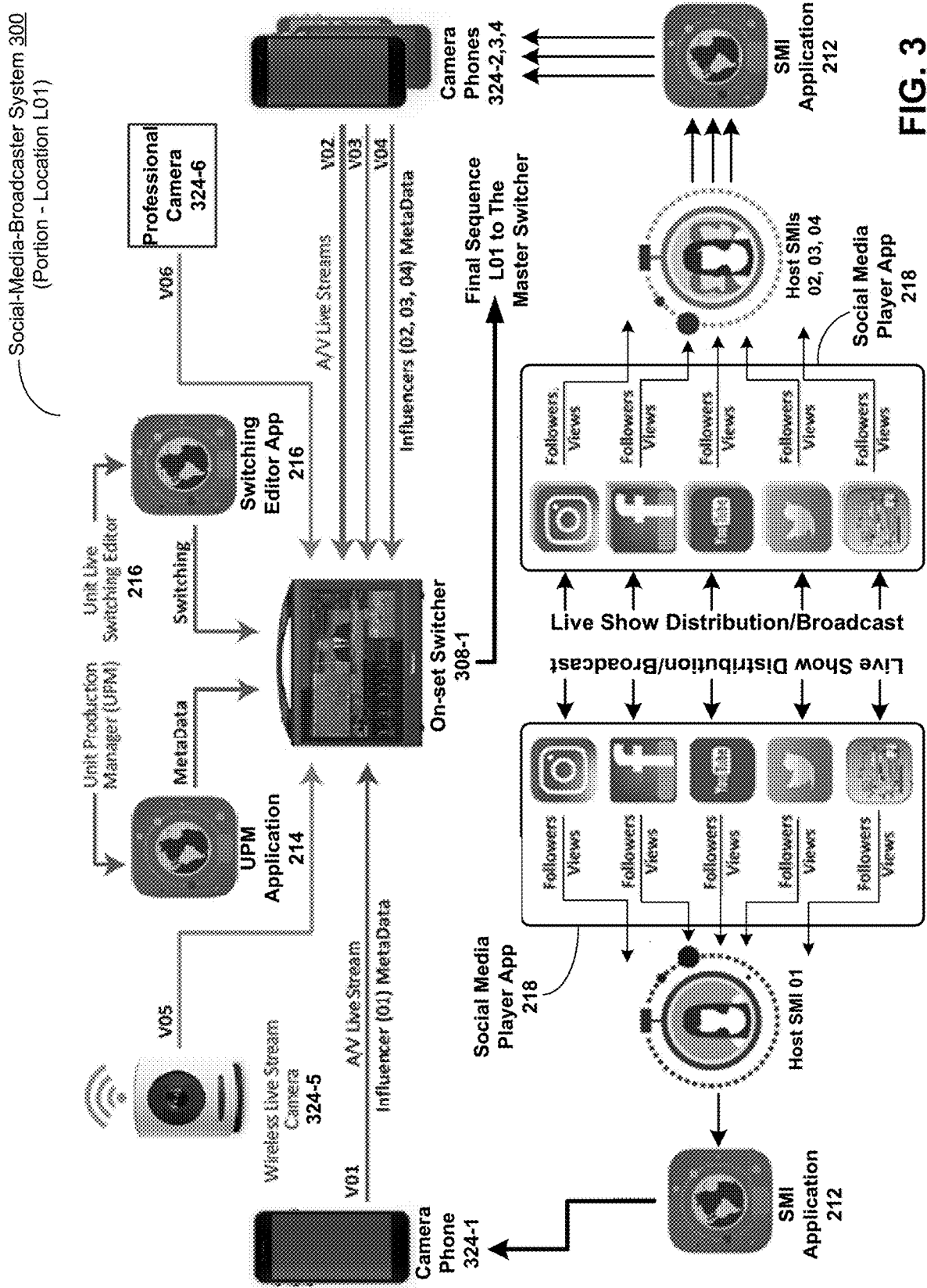
FIG. 3 shows a schematic of a first portion of an exemplary implementation of the SMB system of FIG. 2 at the first shoot location L01 during a live show production in accordance with some embodiments described herein.

FIG. 3 shows a schematic of a first portion of an exemplary implementation 300 of SMB system 200 of FIG. 2 at the first shoot location L01 during a live show production in accordance with some embodiments described herein. As can be seen in FIG. 3, at the center of the first shooting location L01 resides a portable on-set live production switcher 308-1 (or "on-set switcher 308-1"). In the exemplary SMB system 300, on-set switcher 308-1 simultaneously receives at least 6 live video streams during the live show production, including: (1) live stream V01 from a host SMI 01 who hosts the live show for her followers and other audience of the live show using a personal camera phone 324-1; (2) live streams V02, V03 and V04 from host SMIs 02, 03, and 04 who host the live show for their followers and other audience of the live show using their respective personal camera phones 324-2, 324-3, and 324-4; (3) live stream V05 from a wireless live stream camera 324-5 of one of the host SMIs; and (4) live stream V06 generated by a first professional camera 324-6 at location L01. Note that each of the live streams from a given SMI V01-V04 can be augmented with metadata.

FIG. 3 also shows various software modules of SMB system 300 which control the live stream capturing, metadata editing, live stream switching, and final sequence generation. As already described above, these software modules includes SMI application 212 used by host SMIs 01-04, UPM application 214 and switching editor application 216 used by on-set switcher 308-1, and social media player application 218 used by the followers of host SMIs 01-04. FIG. 3 also shows that the followers of host SMIs 01-04 receive live show broadcast through social media player application 218 on the various connected social media platforms of host SMIs 01-04. Also shown in FIG. 3, on-set switcher 308-1 processes the received live streams V01-V06 and generates a final sequence L01 by combining the video streams V01-V06 into a particular sequence order (e.g., L01→V02-V01-V03-V05-V04-V01-V06 as described in more detail below in conjunction with FIG. 5). A set/stream of such final sequences L01 are subsequently transmitted to the master switcher of SMB system 300 (not shown).

Figure 4:
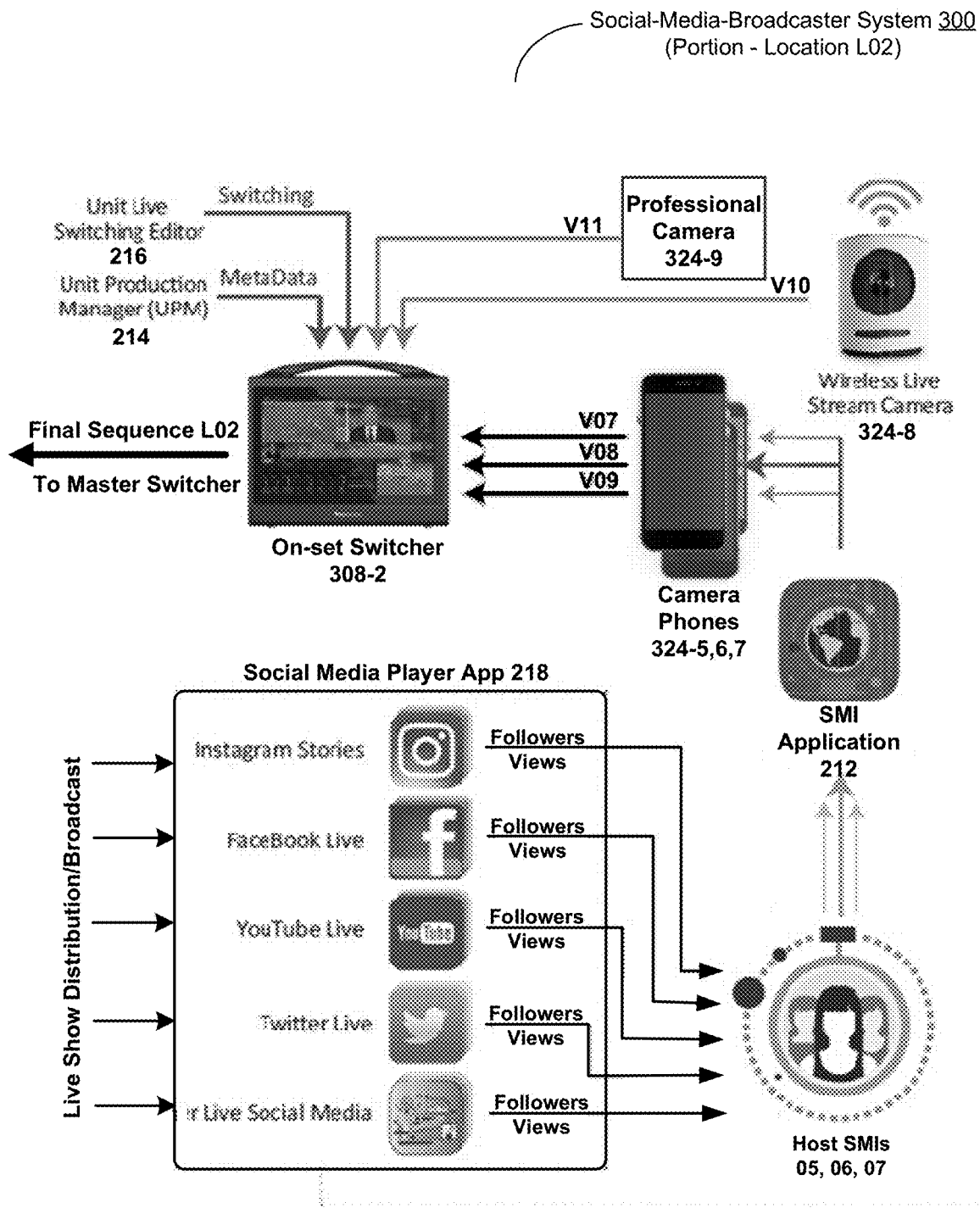
FIG. 4 shows a schematic of a second portion of an exemplary implementation of the SMB system of FIG. 2 at the second shoot location L02 during the live show production in accordance with some embodiments described herein.

FIG. 4 shows a schematic of a second portion of exemplary implementation 300 of SMB system 200 of FIG. 2 at the second shoot location L02 during the live show production in accordance with some embodiments described herein. As can be seen in FIG. 4, at the center of the second shooting location L02 resides a portable on-set live production switcher 308-2 (or "on-set switcher 308-2" hereinafter). In the exemplary SMB system 300, on-set switcher 308-2 simultaneously receives at least 5 live video streams during the live show production, including: (1) live streams V07, V08 and V09 from host SMIs 05, 06, and 07 who host the live show for their followers and other audience of the live show using their respective personal camera phones 324-5, 324-6, and 324-7; (2) live stream V10 from a wireless live stream camera 324-8 of one of the host SMIs; and (3) live stream V11 generated by a second professional camera 324-9 at location L02.

FIG. 4 also shows various software modules of SMB system 300 which control the live stream capturing, metadata editing, live stream switching, and final sequence generation. As already described above, these software modules includes SMI application 212 used by host SMIs 05-07, UPM application 214 and switching editor application 216 used by on-set switcher 308-2, and social media player application 218 used by the followers of host SMIs 05-07. FIG. 4 also shows that the followers of host SMIs 05-07 receive live show broadcast through social media player application 218 on the various connected social media platforms of host SMIs 05-07. Also shown in FIG. 4, on-set switcher 308-2 processes the received live streams V07-V011 and generates a final sequence L02 by combining the video streams V07-V011 into a particular sequence order (e.g., L02-V09-V11-V08-V11-V07-V10-V07 as described in more detail below in conjunction with FIG. 5). A set/stream of such final sequences L02 are subsequently transmitted to the master switcher of SMB system 300 (not shown).

Figure 5:
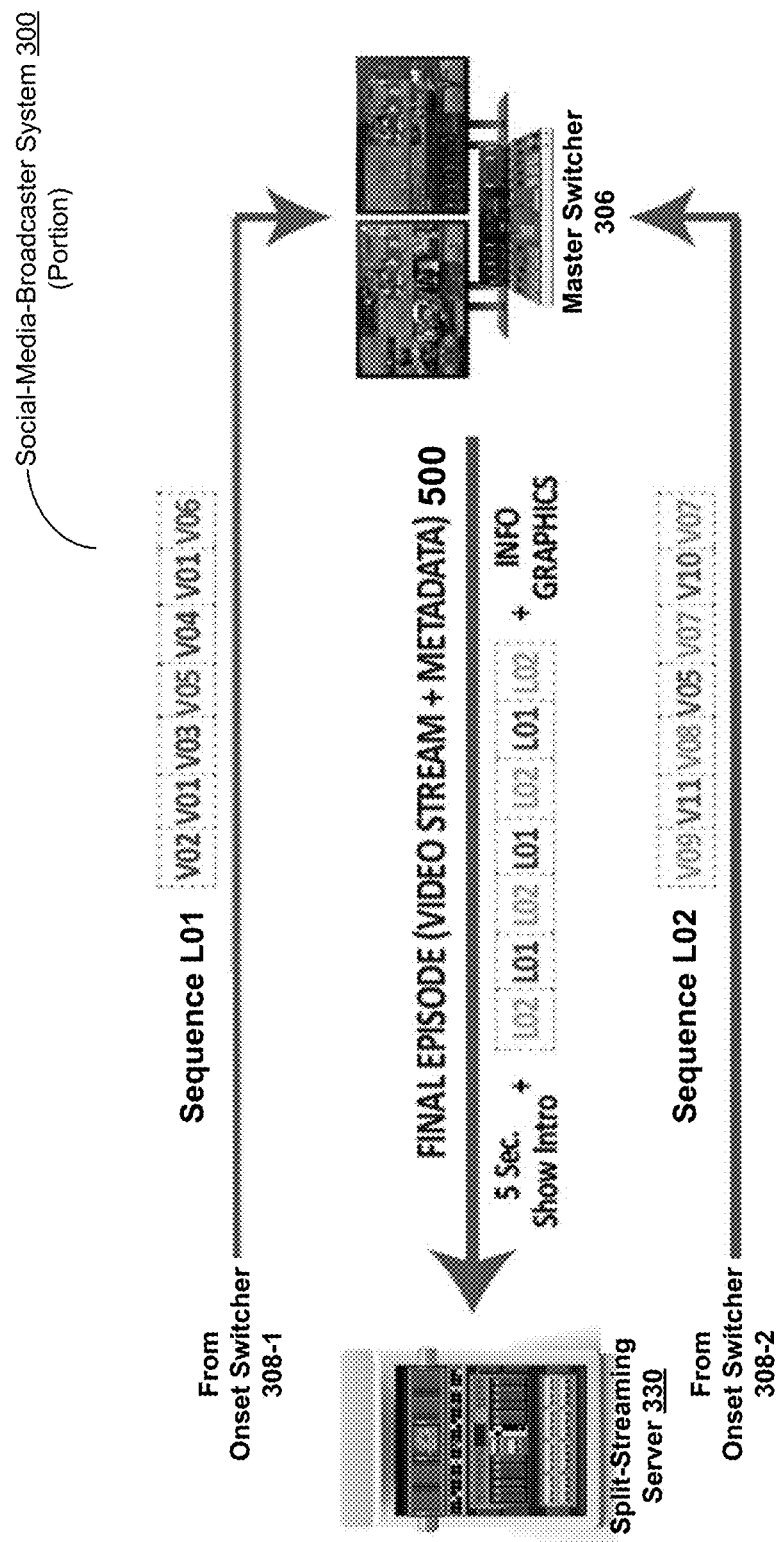
FIG. 5 shows a schematic of a third portion of an exemplary implementation of the SMB system of FIG. 2 including the operations of the master switcher and the split-streaming server during the live show production in accordance with some embodiments described herein.

FIG. 5 shows a schematic of a third portion of exemplary implementation 300 of SMB system 200 of FIG. 2 including the operations of the master switcher and the split-streaming server during the live show production in accordance with some embodiments described herein. As can be seen in FIG. 5, master switcher 306 of exemplary SMB system 300 simultaneously receives both a set of final sequences L01 from on-set switcher 308-1 and a set of final sequences L02 from on-set switcher 308-2. Moreover, exemplary final sequence L01 has a sequence order of V02-V01-V03-V05-V04-V01-V06, whereas exemplary final sequence L02 has a sequence order of V09-V11-V08-V11-V07-V10-V07. Next, master switcher 306 produces the complete/final episode 500 of the live show by switching between the set of live sequences of L01 and the set of live sequences of L02. In the example of FIG. 5, the two sets of live sequences originated from two shooting locations L01 and L02 are arranged into a complete episode 500 of video stream including a show intro and other metadata with the following format:

[5-Sec Show Intro+L02/L01/L02/L01/L02/L01/L02+Infographics].

However, the above sequence order and format of exemplary complete episode 500 is only for illustration purpose while many other sequence orders and formats of complete episode 500 are possible. As can be seen in FIG. 5, split-streaming server 320 of exemplary SMB system 300 subsequently receives the complete episode 500 comprising the video streams and metadata generated by master switcher 306. As described above, and with reference to FIG. 3-5, split-streaming server 330 is configured to distribute/broadcast/stream the complete episode 500 through various connected social media accounts host SMIs 01-07 to the social media player devices of the followers of the host SMIs 01-07. Hence, the followers of the host SMIs 01-07 can view complete episode 500 on their social media player devices using the installed social media player application 218 described above. In some embodiments, split-streaming server 330 is also configured to store the complete episode 500 in a content library and manage the on-demand playback of complete episode 500 at a later time.

Figure 6:
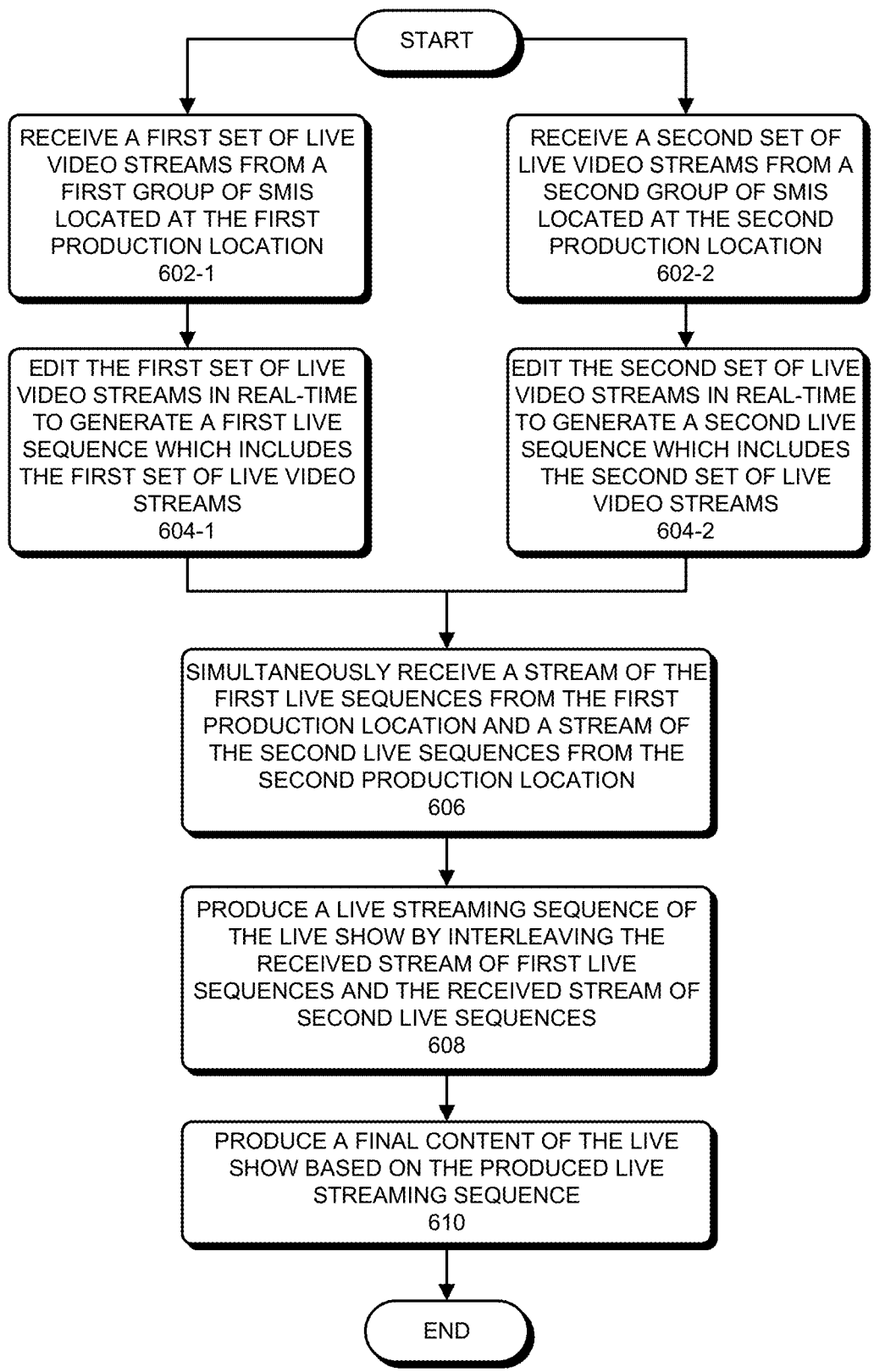
FIG. 6 presents a flowchart illustrating an exemplary process for producing and broadcasting a live social-media show based on multiple live video streams generated by multiple SMIs who serve as hosts of the live show in accordance with some embodiments described herein.

FIG. 6 presents a flowchart illustrating an exemplary process for producing and broadcasting a live social-media show based on multiple live video streams generated by multiple SMIs who serve as hosts of the live show in accordance with some embodiments described herein.

The process may begin simultaneously at a first production location of the live show and at a second production location of the live show. At the first production location, the process can receive a first set of live video streams from a first group of SMIs located at the first production location (step 602-1). The process then edits the first set of live video streams in real-time to generate a first live sequence which includes the first set of live video streams arranged in a given sequential order (step 604-1). Meanwhile at the second production location, the process can receive a second set of live video streams from a second group of SMIs located at the second production location (step 602-2). The process then edits the second set of live video streams in real-time to generate a second live sequence which includes the second set of live video streams arranged in a given sequential order (step 604-2).

Next, the process simultaneously receives a stream of the first live sequences from the first production location and a stream of the second live sequences from the second production location (step 606). The process then produces a live streaming sequence of the live show by interleaving the received stream of first live sequences and the received stream of second live sequences (step 608). The process subsequently produces a final content of the live show based on the produced live streaming sequence (step 610).

New Business Models

The disclosed SMB system allow for combining the talents and resources of multiple (e.g., two and more) SMIs to collaboratively produce and distribute a "TV-like" high quality entertainment content in real-time. When the real-time content of a live show is produced using the disclosed SMB system, each SMI hosting the live show can become one or more of the following: a TV anchor/talent; a member of production team; and a sub-distributor of the produced content. The final content (i.e., the complete episode described above) can be distributed/broadcasted through multiple channels, including through the connected social media accounts of each host SMI associated with a particular live social-media show.

In the disclosed SMB system, an audience/consumer of the SMB system is capable of fully interacting and in some cases even participating in a social-media-reality TV show in real-time. This functionality did not exist before.

As an important feature of the proposed system and technique, audience/consumers of the produced live shows can benefit from the live shows in real life. For example, some consumers can watch a show named "How to pick make-up for your girlfriend." The show can be produced with interactive in-App functionalities, which would allow the consumers to find the proper beauty products from a particular episode in retail stores (for example, Sephora) and purchase these products with a special promo discount (e.g., Sephora may be one of the sponsors of the live show, which will provide the consumers with promo codes or barcodes to scan in order to promote new products or to ensure seasonal sales).

Collaborative Production

When the live show content is produced using the disclosed SMB system, each SMI can: (1) join a collaborative production of a particular episode with other SMIs; and (2) grant a virtual client on a server side of the disclosed system the right to "retranslate," i.e., to allow the virtual client to live broadcast a completed episode on behalf of the SMI (more detail in the section of "Retranslation" below). For example, in the exemplary SMB system 300 of FIGS. 3-5, SMI 01 and SMI 02 (or SMI 03, SMI 04, etc.) simultaneously produce an episode for a particular show.

More specifically, if both SMI 01 and SMI 02 produce videos from a same location (i.e., location L01), an on-set live production switcher at location L01 edits in real-time between multiple cameras (i.e., live video sources) of the two SMIs from this location and outputs a live sequence directly to the master switcher subsystem.

Next, the master switcher subsystem automatically adds 5-second-long intro clip (e.g., as an announcement of the name of the live show), and automatically adds infographics (e.g., including on-screen information similar to what is commonly displayed in the News or live Sports events). In some embodiments, the aforementioned infographics is assigned once when each of the TV anchors is shown for the first time. This infographics may include on-screen text which is extracted from metadata received directly from the on-set cameras by the on-set live production switcher. Multiple produced live sequences (e.g., sequences L01, L02) are transmitted further down the production pipeline to be packaged as a full episode.

In the event there are multiple SMIs producing a given episode of a live show from different locations, each of the different locations can have an on-set live production switcher, which is configured to output a complete live sequence for the associated location. Then the master switcher subsystem further down the production pipeline can be configured to: (1) perform switching between the set of live sequences from multiple locations; (2) automatically adding 5-second-long intro clip (e.g., to announce the name of the live how); and (3) automatically adding infographics and streaming the combined sequences further down the production pipeline packaged as a final/full episode.

In some embodiments, during the broadcasting of the live show, audience of the live show is able to interact (e.g., by voting, commenting, etc.) with the host SMIs of the show, and can potentially become participants of the live show. For example, if a host SMI picks a fan from the audience, the proposed live show production and distribution system can remotely connect a mobile device of that fan to the production pipeline, and include the fan's video signal in the production of the live show in real-time.

Distribution

In some embodiments, the distribution of the produced live social-media-based TV shows can take place in-App simultaneously for all social media accounts of each of the host SMIs assigned to the live show, and the live show subsequently reaches the followers of the host SMIs, who are predisposed to consume the content.

In some embodiments, the disclosed SMB system (e.g., social media player application 218 in SMB system 200) allows audience to browse and watch high quality TV-like content with convenience of Netflix and functionality of Instagram.

Using the disclosed SMB system, the audience is able to truly interact (e.g., by voting and commenting) with hosts of the TV show(s) in real-time, and therefore is able to affect the outcome of the show. This has not been done before in TV shows.

Retranslation

Presently existing technologies do not allow for distributing video signals to multiple social media accounts of multiple SMIs at the same time, which is generally the result of technical limitations of digital mobile phone devices and certain limitations imposed by the existing social media networks.

The disclosed social-media-broadcaster system allows for outsourcing this resource-demanding process of distributing video signals to multiple social media accounts of multiple SMIs from mobile devices to a much more powerful server-based solution. Using a server-based solution, a disclosed main server (e.g., split-streaming server 230 in SMB system 200) is configured to capture a live stream signal of a full episode from a disclosed master switcher subsystem (e.g., master switcher/showrunner 206 in SMB system 200). The disclosed main server can also be configured to duplicate the live stream signal to a high speed SAS RAID storage subsystem. Each of these SAS hard drives can be operated independently by a dedicate server computer. In some embodiments, a dedicated server computer and an associated SAS hard drive together serve as a virtual client.

In some embodiments, the above-mentioned virtual client operates on behalf of a single account of one social media network/platform for a single SMI, and retranslates live stream signal of a produced episode to such a single account on behalf of the single SMI to whom the virtual client is assigned to. For example, if there are 10 SMIs, whereas each SMI allows the disclosed social-media-broadcaster system to retranslate the live show to 5 different social media network accounts, then this exemplary social-media-broadcaster system would include 50 virtual clients (e.g., 50 servers and storage subsystems with 50 dedicated SAS hard drives).

In some embodiments, the aforementioned virtual client operates and streams content to the connected social media accounts of the SMIs only when a given SMI is shooting videos using the disclosed social-media-broadcaster App. In the event that a given SMI uses existing applications (e.g., Instagram, YouTube, Facebook, etc.), the virtual client can become idle/inactive, and the given SMI can post other content (e.g., content not related to the live show(s)) directly to his/her account.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A computer-implemented method of producing and broadcasting a live social-media show based on multiple live video streams generated by multiple social media influencers who serve as hosts of the live show, the method comprising:

at a first production location of the live show:

receiving, using a first on-set switcher located at the first production location, a first set of live video streams from a first group of social media influencers (SMIs) located at the first production location, wherein each of the first group of SMIs hosts the live show by producing at least one of the first set of live video streams; and editing, using the first on-set switcher, the first set of live video streams in real-time to generate a first edited sequence which includes the first set of live video streams arranged in a first sequential order;

at a second production location of the live show:

receiving, using a second on-set switcher located at the second production location, a second set of live video streams from a second group of SMIs located at the second production location, wherein each of the second group of SMIs hosts the live show by producing at least one of the second set of live video streams; and editing, using the second on-set switcher, the second set of live video streams in real-time to generate a second edited sequence which includes the second set of live video streams arranged in a second sequential order; and at a computer:

simultaneously receiving the first edited sequence containing the first set of live video streams arranged in the first sequential order from the first on-set switcher and the second edited sequence containing the second set of live video streams arranged in the second sequential order from the second on-set switcher;

generating a combined segment of the live show by combining the first edited sequence and the second edited sequence in a third sequential order; and producing a final content of the live show by synthesizing a sequence of the combined segments, wherein each combined segment in the sequence of the combined segments contains the first and the second edited sequences arranged in the third sequential order.

2. The computer-implemented method of claim 1, wherein the method further includes broadcasting the produced final content by simultaneously distributing the final content to a set of social media accounts of each SMI in of the first group of SMIs and the second group of SMIs.

3. The computer-implemented method of claim 2, wherein simultaneously distributing the final content to the set of social media accounts of a given SMI includes simultaneously distributing the final content to each of a set of social media platforms logged on by the given SMI.

4. The computer-implemented method of claim 3, wherein simultaneously distributing the final content to the set social media platforms logged on by the given SMI includes duplicating the live signal of the final content into a set of duplicated signals and subsequently transmitting the duplicated signals to each of the set of social media platforms logged on by the given SMI one at a time.

5. The computer-implemented method of claim 3, wherein the method further includes allowing the followers of each SMI in the first group of SMIs and the followers of each SMI in the second group of SMIs to watch the final content through the set of social media platforms logged on by each SMI in the first group of SMIs and each SMI in the second group of SMIs.

6. The computer-implemented method of claim 1, wherein the method further includes:

receiving an emergency broadcast request from a given SMI within the first group of SMIs and the second group of SMIs; and after the requested emergency broadcast is confirmed by the server, streaming the emergency broadcast of the given SMI to each of the social media platforms logged on by the given SMI.

7. The computer-implemented method of claim 1, wherein producing the final content of the live show based on the produced live streaming sequence further includes:

adding metadata into the produced live streaming; and adding a show intro of predetermined length at the beginning of the produced live streaming to generate the final content.

8. The computer-implemented method of claim 1, wherein at least one live video stream among the first set of live video streams is used more than once in the first live sequence.

9. A system for producing and broadcasting a live social-media show based on multiple live video streams generated by multiple social media influencers who serve as hosts of the live show, the system comprising:

a first on-set switcher located at a first production location of the live show, wherein the first on-set switcher is configured to:

receive a first set of live video streams from a first group of social media influencers (SMIs) located at the first production location, wherein each of the first group of SMIs hosts the live show by producing at least one of the first set of live video streams; and edit the first set of live video streams in real-time to generate a first edited sequence which includes the first set of live video streams arranged in a first sequential order;

a second on-set switcher located at a second production location of the live show, wherein the second on-set switcher is configured to:

receive a second set of live video streams from a second group of SMIs located at the second production location, wherein each of the second group of SMIs hosts the live show by producing at least one of the second set of live video streams; and edit the second set of live video streams in real-time to generate a second edited sequence which includes the second set of live video streams arranged in a second sequential order; and a master switcher coupled to the first on-set switcher and the second on-set switcher and configure to:

simultaneously receive the first edited sequence containing the first set of live video streams arranged in the first sequential order from the first on-set switcher and the second edited sequence containing the second set of live video streams arranged in the second sequential order from the second on-set switcher;

generate a combined segment of the live show by combining the first edited sequence and the second edited sequence in a third sequential order; and produce a final content of the live show by synthesizing a sequence of the combined segments, wherein each combined segment in the sequence of the combined segments contains the first and the second edited sequences arranged in the third sequential order.

10. The system of claim 9, wherein the system further includes a streaming server coupled to the master switcher and configured to:
 receive the produced final content from the master switcher; and
 broadcast the produced final content by simultaneously distributing the final content to a set of social media accounts of each SMI in of the first group of SMIs and the second group of SMIs.

11. The system of claim 10, wherein the streaming server is further configured to simultaneously distribute the final content to each of a set of social media platforms logged on by the given SMI.

12. The system of claim 10, wherein the streaming server is further configured to:
 duplicate the live signal of the final content into a set of duplicated signals; and
 transmit the duplicated signals to each of the set of social media platforms logged on by the given SMI one at a time.

13. The system of claim 10, wherein the streaming server is configured to allow the followers of each SMI in the first group of SMIs and the followers of each SMI in the second group of SMIs to watch the final content through the set of social media platforms logged on by each SMI in the first group of SMIs and each SMI in the second group of SMIs.

14. The system of claim 9, wherein the streaming server is further configured to:
 receive an emergency broadcast request from a given SMI within the first group of SMIs and the second group of SMIs; and
 after the requested emergency broadcast is confirmed, stream the emergency broadcast of the given SMI to each of the social media platforms logged on by the given SMI.

15. The system of claim 9, wherein the master switcher is further configured to:
 add metadata into the produced live streaming; and
 add a show intro of predetermined length at the beginning of the produced live streaming to generate the final content.

16. The system of claim 9, wherein at least one live video stream among the first set of live video streams is used more than once in the first live sequence.

* * * * *